UNITED STATES PATENT OFFICE.

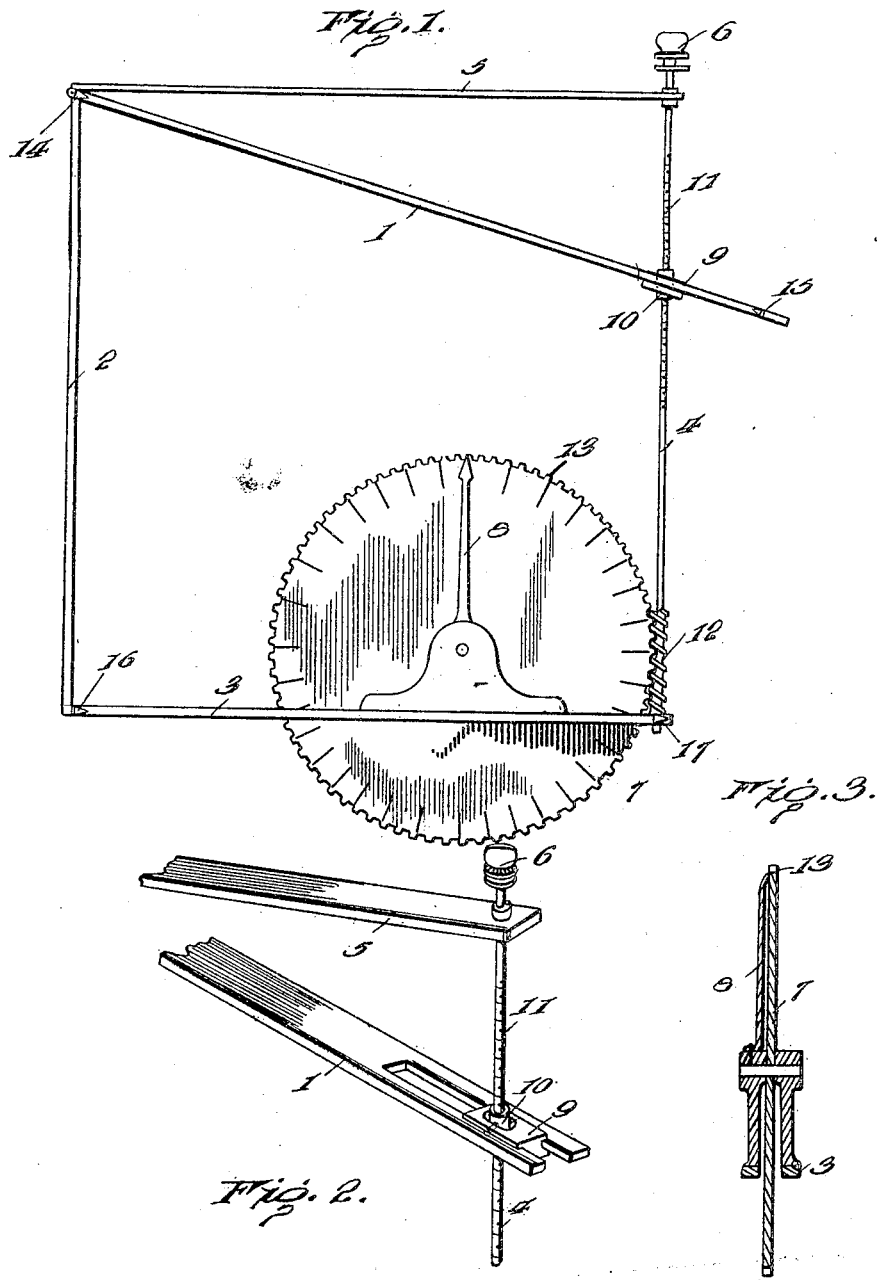

JAY CHUBB AND MILO W. CATHON, OF HELMICK, OHIO; SAID CATHON ASSIGNOR TO SAID CHUBB.

SURVEYING INSTRUMENT.

No. 820,551.     Specification of Letters Patent.     Patented May 15, 1906.

Application filed February 11, 1905. Serial No. 245,278.

*To all whom it may concern:*

Be it known that we, JAY CHUBB and MILO W. CATHON, citizens of the United States, residing at Helmick, in the county of Coshocton and State of Ohio, have invented certain new and useful Improvements in Surveying Instruments, of which the following is a specification.

This invention aims to provide an instrument to determine altitudes and distances without the necessity of actual measurement thereof by means of the usual surveyor's chain, thereby saving time, labor, and obviating mathematical calculations.

In accordance with this invention the instrument is constructed on the geometrical principle of the equation between corresponding parts of similar right-angle triangles, certain parts being given and the unknown quantity corresponding to the distance to be determined, which in the present instance is designated by an indicator which moves proportionately to the declination or change of angle of a swinging bar or rod designed to indicate the hypotenuse of the triangle determined by the instrument.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings.

Figure 1 is a side view of an instrument embodying the invention. Fig. 2 is a detail perspective view of a portion of the set-screw, its upper support, and the free end portion of the swinging bar. Fig. 3 is a detail perspective view of the end portion of the base provided with the indicator.

Corresponding and like parts are referred to in the following description and indicated in all the views of the drawings by the same reference characters.

The instrument comprises sides 1, 2, and 3, which correspond approximately to the parts of a right-angle triangle, of which the part or side 1 represents a portion of the hypotenuse, the side 2 the perpendicular, and the side 3 the base or horizontal. The parts 1, 2, and 3 preferably consist of bars or rods, the parts 1 and 3 being foreshortened, so as not to complete the triangle. The bars 2 and 3 have a fixed relation, whereas the bar 1 articulates with the perpendicular 2 to admit of varying its inclination to adapt the instrument to the measurement to be taken. The bar 1 may be jointed to the perpendicular 2 in any manner and is adjusted toward and from the base 3 at the end remote from the perpendicular by means of a set-screw 4, which consists of a slender rod mounted at or near its ends in the base 3 and in an arm or bar 5, projected from the perpendicular 2 about parallel with the base 3. The bar or rod 5 constitutes a support for one end of the set-screw solely. A knob or button 6 is fitted to one end of the set-screw for convenience of rotating the same to effect adjustment of the bar 1 when setting the instrument to take a measurement. The knob or button 6 is suitably graduated in degrees to indicate the point of the compass or the amount of turning of the set-screw when it may be required to indicate the angle through which the set-screw may be moved in effecting adjustment of the instrument.

A dial 7 is mounted upon the base 3 and is suitably graduated, preferably in rods or like parts of linear measurement. A perpendicular pointer 8 coöperates with the dial 7 and is relatively fixed or stationary and is mounted upon the base 3. The dial 7 and pointer 8 constitute parts of an indicator for designating the resultant measurement after the instrument has been set to determine an altitude or a horizontal distance. The parts 7 and 8 may be mounted in any convenient and determinate way and may be of any construction. As shown, the base 3 is slotted to accommodate the dial, which is fitted into the space formed between the separated parts, and the pointer 8 projects from a bearing-block in which the dial is mounted.

The bar 1 is bifurcated at its outer end, and in the longitudinal recess or slot thus formed there is mounted a longitudinally-slidable block 9, and the latter carries a nut 10, pivoted therein in any manner, so as to adapt itself to the angular change between the slide and set-screw incident to the adjustment of the bar 1 when adapting the instrument to take a measurement. The nut 10 is threaded to conform to the threaded portion 11 of the set-screw, the thread being comparatively fine, so as to adapt the instrument to a wide range of measurement. The set-screw 4 is also provided with a coarse thread 12, which is in mesh with complemental cogs 13 on the periphery of the dial 7, whereby the latter is turned as the set-screw is rotated. The difference in the pitch of the threads 11 and 12 is mathematically determined with reference to the general construction of the instrument and the graduations on the dial 7. A movement of the outer or free end of the swinging bar results in a correspondence of the dial 7, and inasmuch as the proportion of the parts have been mathematically determined the measurements designated by the indicator may be relied upon.

Sights 14 and 15 are provided at opposite ends of the swinging bar 1, and corresponding sights 16 and 17 are located at opposite ends of the base or horizontal 3. Inasmuch as the lengths of the parts 1 and 2 are known and the angle between the parts 2 and 3 is fixed and a right angle, measurements may be readily determined by holding the instrument so that a line determined by the sights 16 and 17 in alinement with the object will intersect a line determined by the sights 14 and 15 also in alinement with the object, it being understood that the base 3 must either occupy a true horizontal position or project at a right angle from the line of measurement and the side 2 be parallel with said measurement. Obviously the inclination of the swinging bar 1 will vary according to different measurement in order that the line determined by the sights 14 and 15 may intersect with one extremity of the measurement. Since the inclination of the swinging bar is regulated by the set-screw 4 and the latter in turn effects a proportionate movement of the dial 7, the distance to be determined is shown by the indicator and may be found on the dial 7 opposite to the pointer 8. The sights may be of any construction, such as is commonly provided in surveying instruments.

Having thus described the invention, what is claimed as new is—

1. A surveying instrument comprising two right-angularly-disposed bars or rods, a swinging bar or rod pivotally connected at one end to one of said right-angular bars, and having its other end bifurcated, a block 9 mounted to slide in said bifurcated end, a set-nut pivotally mounted in said block, a set-screw mounted in one of the first-named bars and working in said nut whereby to adjust the angular position of the swinging bar, and means for indicating the different angular positions of said bar.

2. A surveying instrument comprising two fixed bars 2 and 3 arranged at right angles to each other, a bar 5 secured to the outer end of one of said bars and parallelling the other, a set-screw connecting the opposite end of the bar 5 with the bar 3, a swinging bar or rod pivotally mounted at one end at the juncture of the bars 2 and 5 and having its opposite end bifurcated, a block 9 mounted to slide in said bifurcated end, a set-nut pivotally mounted in said block and accommodating said set-screw whereby to adjust the angular positions of the swinging bar, and means for indicating the different positions of said bar.

In testimony whereof we affix our signatures in presence of two witnesses.

JAY CHUBB. [L. S.]
MILO W. CATHON. [L. S.]

Witnesses:
LLOYD N. STOOTS,
LEN WILLIAMS.